US010252556B2

(12) United States Patent
Levin et al.

(10) Patent No.: US 10,252,556 B2
(45) Date of Patent: Apr. 9, 2019

(54) SELECTIVE OVERCOAT (71) Applicant: HP SCITEX LTD., Netanya (IL)

(72) Inventors: Oren Levin, Netanya (IL); Eldad Manheim, Arsuf (Moshav Rishpon) (IL); Sharon Regev, Ramat Hasharon (IL); Alex Veis, Netanya (IL)

(73) Assignee: HP SCITEX LTD., Netanya (IL)

( * ) Notice: Subject to any disclaimer, the term of this patent is extended or adjusted under 35 U.S.C. 154(b) by 0 days.

(21) Appl. No.: 15/614,724

(22) Filed: Jun. 6, 2017

(65) Prior Publication Data

US 2018/0043716 A1 Feb. 15, 2018

(30) Foreign Application Priority Data

Aug. 11, 2016 (EP) ..................................... 16183875

(51) Int. Cl.
*B41M 7/00* (2006.01)
*B41M 5/00* (2006.01)
*B41M 5/41* (2006.01)
*B32B 9/04* (2006.01)
*B41J 11/00* (2006.01)
*B32B 37/12* (2006.01)

(52) U.S. Cl.
CPC ............... *B41M 5/41* (2013.01); *B32B 9/045* (2013.01); *B41J 11/002* (2013.01); *B41J 11/0015* (2013.01); *B41M 5/0017* (2013.01); *B41M 7/0018* (2013.01); *B41M 7/0027* (2013.01); *B41M 7/0036* (2013.01); *B41M 7/0045* (2013.01); *B41M 7/0054* (2013.01); *B32B 2037/1253* (2013.01); *B32B 2554/00* (2013.01)

(58) Field of Classification Search
CPC .... B41M 5/0011; B41M 5/0017; B41M 5/41; B41M 7/0036; B41M 7/0045; B41M 7/0054; B41M 7/0018; B41M 7/0027; B41J 11/0015; B41J 2/2114; B41J 11/002; B32B 9/045; B32B 2554/00; B32B 2037/1253
See application file for complete search history.

(56) References Cited

U.S. PATENT DOCUMENTS 5,690,439 A * 11/1997 Sasaki ...................... B41J 17/32
347/176
5,982,405 A * 11/1999 Sasaki ...................... B41J 2/325
347/176
(Continued)

FOREIGN PATENT DOCUMENTS

| CN | 101266420 | 9/2008 |
| CN | 101791917 | 8/2010 |
| CN | 103619597 | 3/2014 |

OTHER PUBLICATIONS

"Overprint Varnishes", New Africa Inks, Retrieved from the Internet on May 19, 2016, http://www.newafricainks.co.za/varnishes/.

*Primary Examiner* — Huan Tran
(74) *Attorney, Agent, or Firm* — HP Inc. Patent Department (57) ABSTRACT Examples described herein include examples methods for generating varnish knockouts that include applying a fixer material to a surface of a print medium, selectively applying a print material over the fixer material to form an image, and applying an overcoat material to form a durable coating on areas over the image and a nondurable coating over other areas of the surface.

19 Claims, 7 Drawing Sheets (56) References Cited

U.S. PATENT DOCUMENTS

| | | | |
|---|---|---|---|
| 7,246,896 B2 | 7/2007 | Askeland et al. | |
| 8,465,118 B2 | 6/2013 | Emamjomeh et al. | |
| 8,993,103 B2 | 3/2015 | Clauter et al. | |
| 9,278,515 B2 | 3/2016 | Sarkisian et al. | |
| 2005/0225618 A1* | 10/2005 | Askeland | B41M 7/0027 347/100 |
| 2011/0304661 A1* | 12/2011 | Emamjomeh | B41J 2/2114 347/1 |
| 2012/0123014 A1 | 5/2012 | Chretien et al. | |
| 2013/0057637 A1 | 3/2013 | Sen | |
| 2015/0000559 A1 | 1/2015 | Mohapatra et al. | |
| 2018/0043716 A1 | 2/2018 | Levin et al. | |

* cited by examiner

SELECTIVE OVERCOAT

BACKGROUND

It is possible to print on many different types of print media. For example, print systems exist to print on paper, plastics, card stock, corrugated cardboard and other media. Once the media is printed it can be further processed to create specific objects. In some scenarios, the printed media, such as a printed corrugated cardboard, can be folded, creased, cut, or scored to create boxes or display structures. To protect the printed image on such print media during the additional processing, some printing systems applying an overcoat material to create a durable coating over the printed image to resist scratching, smearing, or other degradations.

DETAILED DESCRIPTION

In various use cases, printed low-grade or commodity quality print media, such as card stock or corrugated cardboard, are used to form boxes, packaging, display installations, and the like. In such scenarios, the printed media is first printed while it is still in a relatively flat condition. The sheets of the print media are then stacked for later processing or fed directly into other finishing devices. For example, the printed media can be further processed using various cutting, folding, scoring, gluing, printing, or cutting devices to process the printed media into the end product (e.g., a retail box, retail display case, serialized shipping cartons, etc.).

The stacking and/or further processing of the printed media can often cause smudges, scratches or other degradations to the printed images. To avoid such damage to the printed image, many printing systems apply an overcoat material, such as a varnish, to form a durable coating on top of the printing material used to generate the printed image. However, the same properties of the overcoat material that aid in preventing damage to the printed image can also cause complications when trying to print or apply adhesives to the surface of the print media during the additional processing. For example, in some instances a manufacturer of boxes may wish to cut, fold, or otherwise include the printed print media into a box and print a tracking number or serial number on that box. In such cases, the overcoat material on the printed surface of the print media can prevent the adhesive from forming a durable bond and/or durably accept the printing material.

To provide for regions on the printed surface of the print media on which adhesive or subsequent printing material can be durably applied, implementations of the present disclosure include systems, devices, and methods for generating varnish knockout regions using a corresponding durable coating inhibiting fixer material. In some implementations, the fixer material can also aid in the fixation of the printing material to the print media to generate high-quality and vibrant printed images. Accordingly, in various implementations, the fixer material used to both to aid in the generation of high-quality printed images can also be formulated to prevent the overcoat material from forming a durable coating in specific regions on the surface of the printed print medium. In the regions where the overcoat material is inhibited from forming a durable coating, the overcoat material can be removed to provide printable or bondable regions in which printing material and/or adhesive can be applied.

Figure 1:
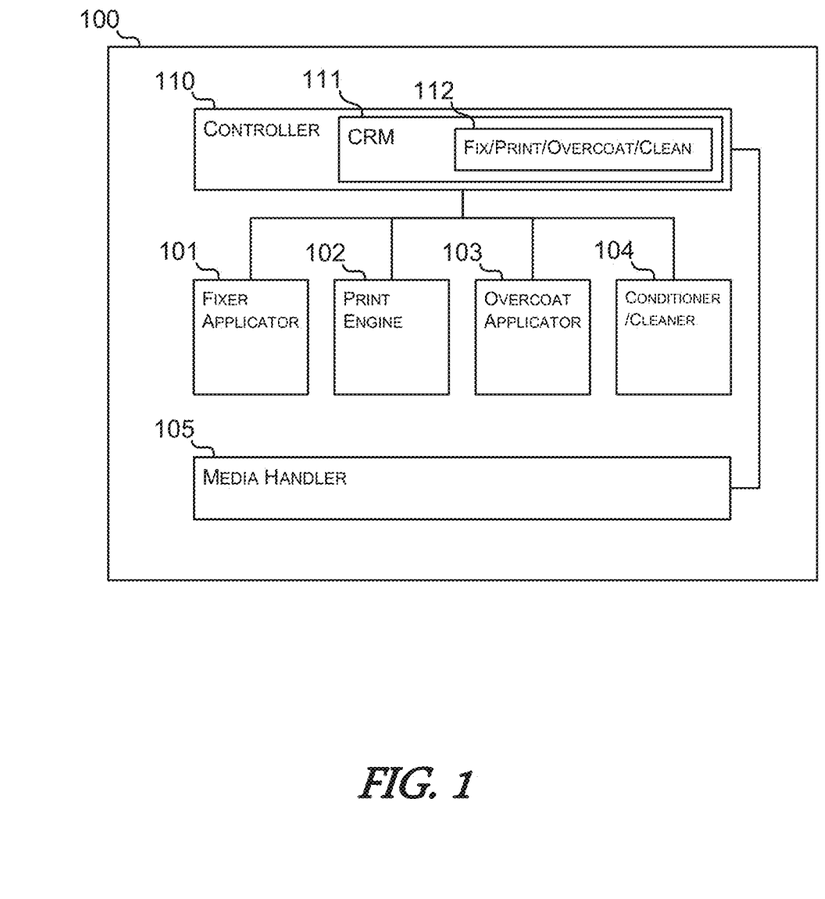
FIG. 1 depicts a schematic representation of an example printing system.

FIG. 1 depicts a schematic representation of an example printing system 100 according to various implementations of the present disclosure. As shown, the example printing system 100 can include a controller 110 coupled to a fixer applicator 101, a print engine 102, an overcoat applicator 103, and a conditioner/cleaner 104. In some implementations, as in the example shown, the printing system 100 may also include a media handler 105 coupled to the controller 110. In any such implementation, the controller 110 can include a non-transitory computer readable medium 111 on which can be stored executable code for controlling the fixer applicator 101, the print engine 102, the overcoat applicator 103, the conditioner/cleaner 104, an/or the media handler 105. Accordingly, the controller 110, such as a processor, a microcontroller, or any other combination of hardware and/or executable code, can execute the executable code 112 stored on the non-transitory computer readable medium 111 to control the various components of the example printing system 100 to execute the corresponding operations to implement the functionality of the system as a whole and the individual components described herein.

Figure 2:
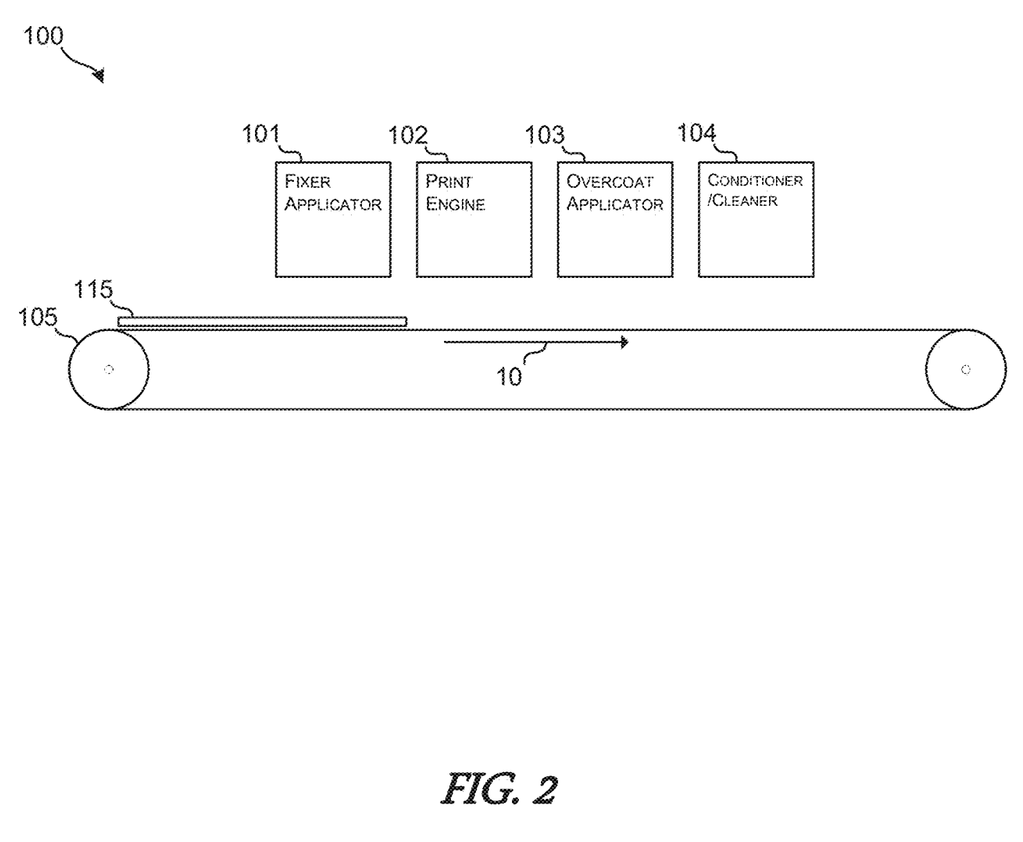
FIG. 2 depicts another schematic representation of the example printing system.

FIG. 2 shows another depiction of the example printing system 100. In the specific depiction shown, the media handler 105 includes a conveyor belt type conveyance for moving sheet or web type print material in the direction indicated by arrow 10 for presentation to the fixer applicator 101, the print engine 102, the overcoat applicator 103, and the conditioner/cleaner 104. While a conveyor belt type media handler 105 is depicted, other types of media handlers are possible. In the specific example depicted in FIG. 2 the print media 115 is depicted as a sheet type print media (e.g., a sheet of corrugated cardboard or card stock).

In such implementations, the print media 115 can be moved along the direction indicated by arrow 10 by the media handler 105 to be presented first to the fixer applicator 101. In various implementations of the disclosure, the fixer applicator 101 can include any type of analog and/or digital application mechanism for applying a layer or coating of fixer material. For example, the fixer applicator 101 can include a liquid applicator, such as a roller, a brush, a sprayer, a digitally controlled jet system, a flexographic printing plate, and the like.

As the media handler 105 moves the print media 115 past the fixer applicator 101, a fixer material can be applied to any or all regions of the surface of the print media 115. The print engine 102 can then selectively apply various monochromatic or polychromatic printing materials on top of the regions of the fixer material applied by the fixer applicator 101. Accordingly, the print engine 102 can print on or otherwise apply printing material to sub regions of the regions of the print media 115 on which fixer material has been applied. In implementations of the present disclosure, the print engine 102 can include any combination of printing elements. For example, the print engine 102 can include various types of inkjet print heads, electrophotographic printing elements, or any other type of digital and analog printing technologies.

The fixer material can include any type of liquid, semi-liquid, or gel having a physical, chemical, or other material properties that can interact with an/or react to printing material applied by the print engine 102 and/or the overcoat applicator 103. For instance, the fixer material applied by the fixer applicator 101 can include any of various types of salt solutions. Such salt solutions can be formulated with a particular saline concentration so as to cause the small particles of pigments in the printing material applied by the print engine 102 to form larger particles of pigments. The formation of larger particles of pigments helps prevent the pigments from being absorbed or penetrating past the surface of the print media 115. As such, the larger particles tend to stay on the surface of the print media 115 to produce more saturated and vibrant printed images.

To protect the printed image on the print media 115, the print media 115 can be moved by the media handler 105 to be presented to the overcoat applicator 103. The overcoat applicator 103 can apply a layer of overcoat material on top of the printing material and the fixer material previously applied to the print media 115. As described herein, the fixer material applied by the fixer applicator 101 can interact with the overcoat material applied by the overcoat applicator 103 in regions where the two materials are not separated by an intermediate application of printing material applied by the print engine 102.

In various implementations of the present disclosure, the overcoat material can include various types of varnishes. Such varnishes can have specific physical, chemical, and/or material properties which in the presence of the fixer material will not dry or cure into a durable coating. For example, the varnishes can be water-soluble or saline phobic such that it interacts with a salt based fixer material. In various implementations, in the regions of the print media 115 in which the fixer material and the overcoat material are in contact with one another, the two interact with one another to prevent the overcoat material from forming a durable coating in those regions. In contrast, the regions in which the overcoat material is in contact with the printing material, the overcoat material can dry and/or cure to form a durable protective coating over the printed regions of the print media 115. The interaction between the overcoat material and the fixer material can cause the overcoat material, such as a varnish, to dry into a nondurable or powdery layer which can be easily removed with brushes and/or bursts of air or other gas.

In some implementations, the conditioner/cleaner 104 can include components for conditioning and/or cleaning the nondurable layers of overcoat materials and fixer materials in the regions in which the two materials are in contact with one another. For example, the conditioner/cleaner 104 can include heaters/dryers for drying or curing the overcoat material. The regions in which the overcoat material does not form a durable coating, the conditioner/cleaner 104 can also include various cleaning elements, such as air nozzles, brushes, rollers, and the like, for removing the nondurable regions of overcoat material and/or fixer material. In this way, the regions in which the fixer material and the overcoat material are in contact with one another can be taken down to the bare surface of the print media 115 such that it is accessible for additional printing and/or gluing in further processing of the print media 115.

FIGS. 3 through 6 depicts the various stages of a printing process according to implementations of the present disclosure. In particular, FIGS. 3 through 6 depicts the treatment of the print media 115 by the various components of the example printing system 100 in the various corresponding stages of the printing process.

Figure 3:
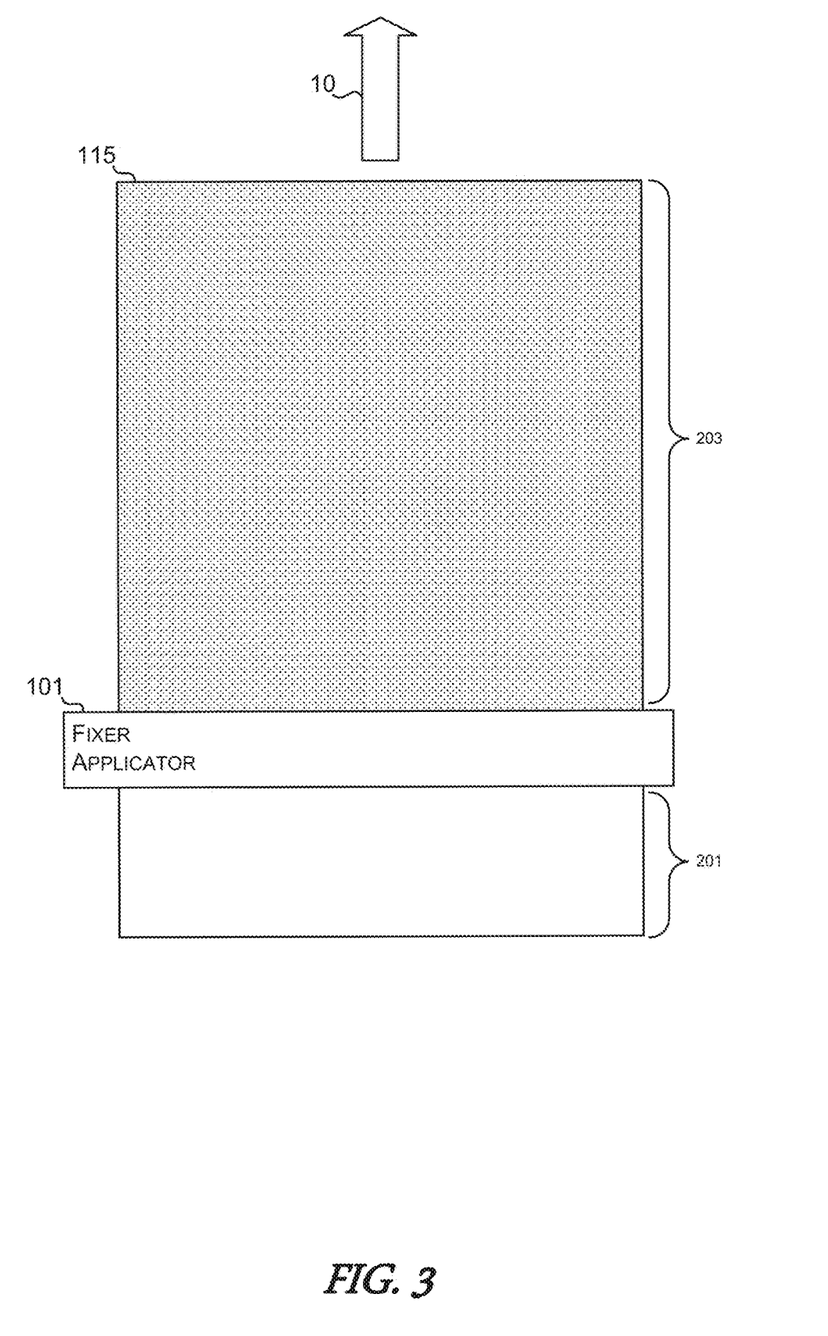
FIG. 3 depicts a schematic representation of a fixer application stage in an example printing process.

FIG. 3 illustrates the application of the fixer material by the fixer applicator 101 to the print media 115 as it moves in the direction indicated by arrow 10. In FIG. 3, the print media 115 is depicted as partially treated with the fixer material being applied by the fixer applicator 101. The region 203 represents the region of the print media 115 on which the fixer material has been applied, while the region 201 depicts the region of the print media 115 that is still untreated by the fixer applicator 101. Once the surface of the print media 115 is coated with the fixer material, it can be fed or otherwise passed to the print engine 100 to, as depicted in FIG. 4.

Figure 4:
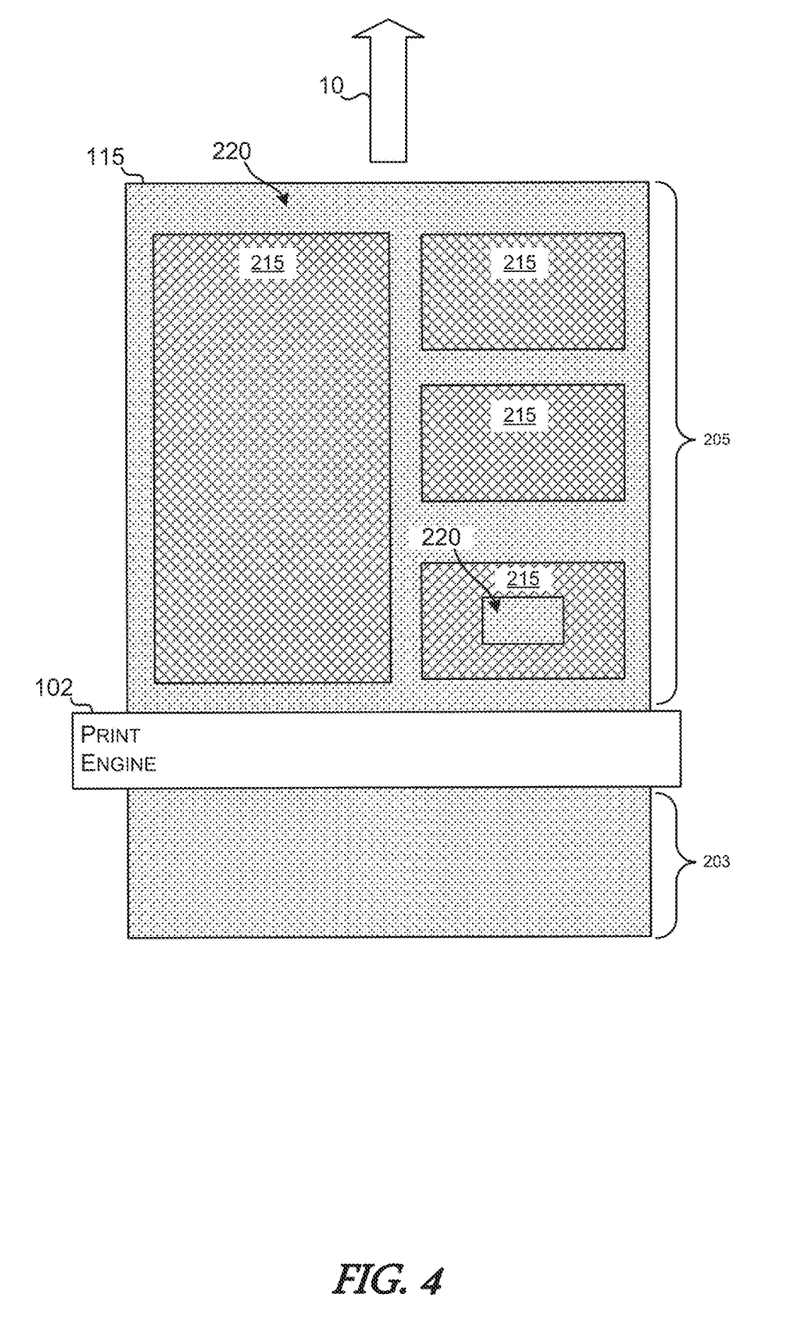
FIG. 4 depicts a schematic representation of a printing material application stage in the example printing process.

As shown in FIG. 4, the print medium 115 is coated first with the fixer material on which the print engine 102 can selectively apply printing material to the regions 215. As the print medium 115 moves the direction indicated by arrow 10, the region 205 of the print medium 115 includes printed regions 215 and under printed regions 220. The printed regions 215 can include any type of printed image that includes one or more colors of printing material that includes corresponding colored pigments. As shown, the unprinted regions 220 can be disposed around and/or disposed within printed regions of 215. For the sake of clarity, the regions 220 represent regions in which the surface of the print medium 115 is only treated with the fixer material, and the regions 215 represent regions in which printing material is applied on top of the fixer material. Once the print engine 102 has completed applying printing material on top of the fixer material to generate corresponding printed images, the print medium 115 treated now with the fixer material and printing material can be passed to or otherwise presented to the overcoat applicator 103, as depicted in FIG. 5.

Figure 5:
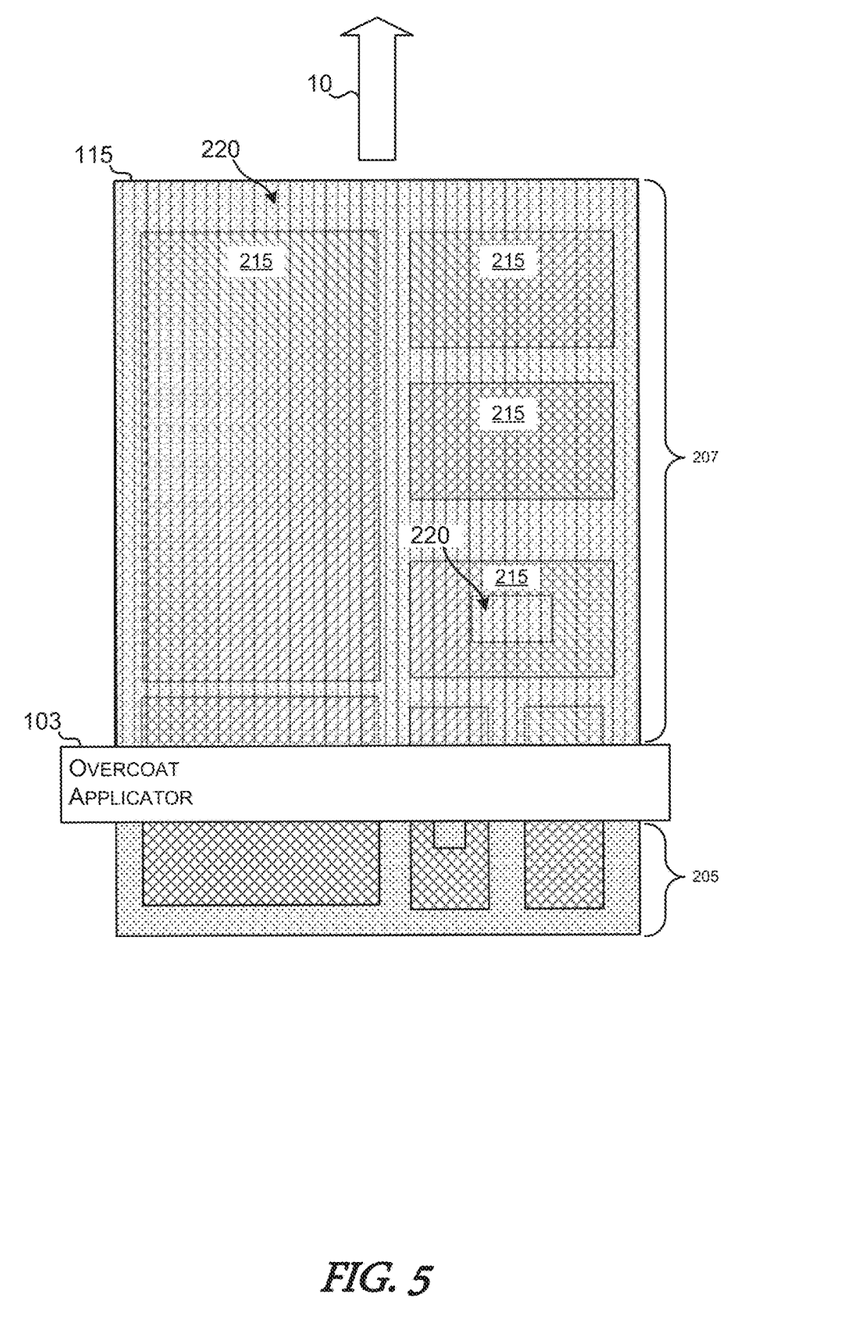
FIG. 5 depicts a schematic representation of an overcoat application stage in the example printing process.
Figure 6:
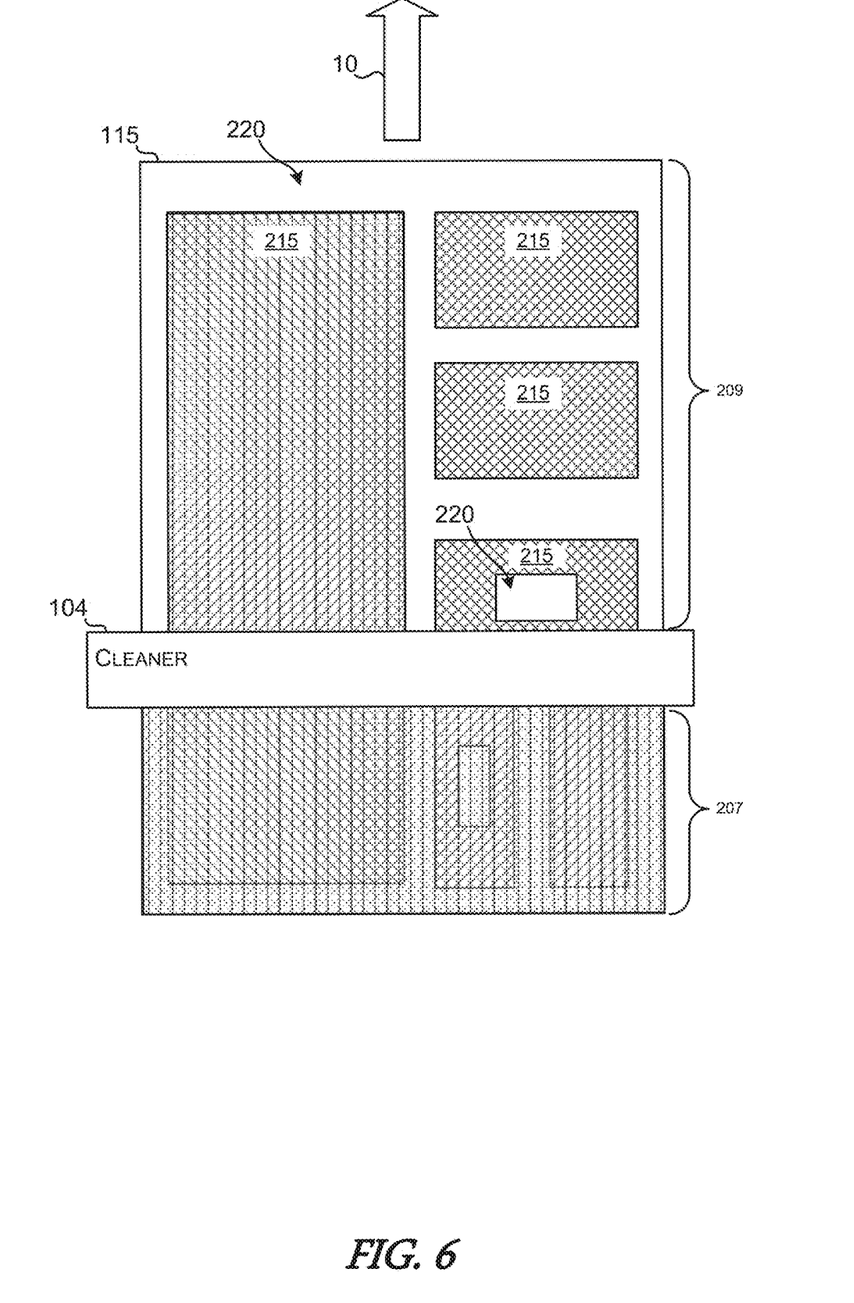
FIG. 6 depicts a schematic representation of a cleaning stage in the example printing process.

As shown in FIG. 5, the overcoat applicator to apply an overcoat material, such as a varnish, on top of the regions 215 and 220 of the print medium 115. In such implementations, the overcoat applicator 103 can include any type of digital or analog coating mechanism for applying the fluid overcoat material. In the particular stage depicted in FIG. 5 of applying the overcoat material, the region 205 represents the region of the print medium 115 which is been coated only with the fixer material and printing material, while the region 207 represents the region of the print medium on which the overcoat material has been coated on top of the regions 215 and 220.

With the overcoat material applied on top of the printing material and the fixer material, the print medium 115 can be moved along the direction indicated by arrow 10 to be passed to or otherwise resented to the conditioner/cleaner 104. In various implementations, the conditioner/cleaner 104 can dry or otherwise cure the overcoat material to generate durable coatings in regions 215 and nondurable layers or residues in regions 220. To aid in the removal of the nondurable layers or residues in regions 220, the conditioner/cleaner 104 can include blowers, brushes, sponges, rollers, vacuums, and/or other cleaning elements to remove the nondurable layers of the cured overcoat material in the regions 220. In such implementations, when the nondurable layers or residues of the overcoat material are removed, the original surface of the print medium 115 can be exposed for applying glue, adhesive, or other inks in subsequent processing operations of the print medium 115.

Figure 7:
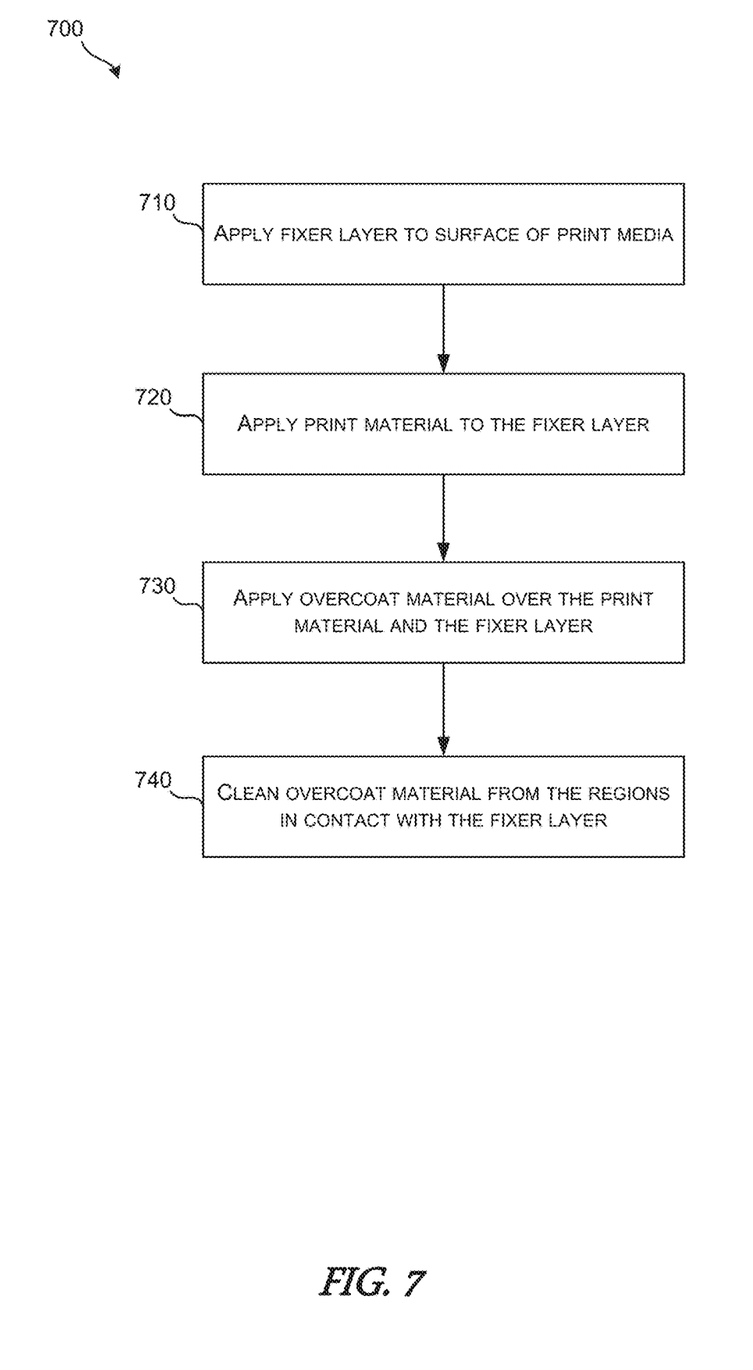
FIG. 7 is a flowchart of an example method for creating overcoat knockout regions using a fixer material.

FIG. 7 depicts a flowchart of an example method 700 for generating overcoat knockouts in printing systems that use a fixer material, printing material, and overcoat material. The method 700 can begin at box 710 in which the printing system can apply a fixer material layer to the surface of a print medium. In various implementations of the present disclosure, the fixer applicator 101 can uniformly roll or otherwise apply a layer of fixer material across the entire surface of a print medium. The fixer material can include any type of liquid that includes chemical, physical, and/or material properties that can interact with the printing materials and/or the overcoat materials used in the particular printing process.

At box 720, a print material can be selectively applied to the layer of fixer material to generate corresponding printed images. In various implementations of the present disclosure, the fixer material can cause the smaller particles of pigment in the printing material to cluster with one another to generate or form larger particles of pigment. The larger particles of pigment thus do not penetrate into or past the surface of the print medium. When the particles of pigment remain on the surface of the print medium, the resulting printed images can appear to be more saturated or vibrant. In some implementations, the printing material can be applied by the print engine 102 described herein.

In some example implementations, the salt of the fixer material crushes the varnish of the overcoat material (e.g. varnish) in the non-printed areas of the print media but does not crush the overcoat in the printed areas of the print media. The mechanism in such implementations can include the ink that is used in the printed areas of the print media forming a durable solid layer that prevents the underlying salt of the fixer material from interacting with the overcoat material applied on top of the fixer material and the printing material. In some implementations, the fixer material layer applied to the print media can include one or multiple materials each formulated to interact with (e.g., crush) the printing material, the overcoat material, or both the printing material and the overcoat material.

Once the printed image is applied on top of the fixer material on the print medium, an overcoat material can be applied on top of the printing material and the fixer material layer, at box 730. In some implementations, the overcoat applicator 103, which can include analog and/or digital application mechanisms, can apply a coating of liquid or gel overcoat material. In regions where the overcoat material is in direct contact with the fixer material, the chemical, physical, and/or material properties of the overcoat material and the fixer material can prevent the overcoat material from forming a durable coating. In such regions, the conditioner/cleaner 104 can clean the overcoat material from the surface of the print media, at box 740. Cleaning the overcoat material from the regions that are in direct contact with the fixer material can include brushing, vacuuming, or blowing the nondurable layer of overcoat material from the surface of the print medium 115. The regions in which the overcoat material can be removed from the surface of the print medium 115 can be referred to as knockout regions.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A system comprising:
    a fixer applicator to apply a fixer material to a region of a print medium
    a print engine to apply selectively a print material to sub regions of the region over the fixer material; and
    an overcoat applicator to apply an overcoat material over the fixer material and the print material in the region;
    wherein the fixer material prevents the print material from penetrating the print medium, and prevents the overcoat material not in the sub regions from forming a durable coating.

2. The system of claim 1 further comprising a component that is one from the set consisting of a dryer to condition the overcoat material in direct contact with the fixer material into a nondurable layer and a cleaning element to remove the overcoat material from the areas of the regions not in the sub region.

3. The system of claim 2 wherein the component is a first component and is a cleaning element, and further comprising a second component that is a dryer to condition the overcoat material in direct contact with the fixer material into a nondurable layer.

4. The system of claim 3 wherein the nondurable layer comprises a powder.

5. The printing system of claim 2 wherein the component is a first component and is a dryer, and further comprising a second component that is a cleaning element to remove the overcoat material from the areas of the regions not in the sub region.

6. The printing system of claim 1 further comprising a media handler.

7. A method comprising:
    applying a fixer material to a surface of a print medium;
    selectively applying a print material over the fixer material to form an image; and
    applying an overcoat material to form a durable coating on areas over the image and a nondurable coating over other areas of the surface.

8. The method of claim 7 wherein the nondurable coating is formed in the other areas due to an interaction between the fixer material and the overcoat material.

9. The method of claim 7 wherein the fixer material comprises a salt solution.

10. The method of claim 7 further comprising removing the nondurable coating from the other areas of the surface.

11. The method of claim 10 wherein removing the nondurable comprises treating the print media with a blower, a brush, a sponge, a roller, or a vacuum.

12. The method of claim 10 further comprising applying an adhesive or a second print material to some of the other areas of the surface.

13. A printing system comprising:
    a controller;
    a non-transitory computer readable medium comprising executable code that when executed by the controller cause the controller to control:
        a fixer applicator to apply a fixer material to a region of a print medium
        a print engine to apply selectively a print material to sub regions of the region over the fixer material;

an overcoat applicator to apply an overcoat material over the fixer material and the print material in the region; and a dryer to condition the overcoat material in direct contact with the fixer material into a nondurable layer.

14. A printing system comprising:

a controller;

a non-transitory computer readable medium comprising executable code that when executed by the controller cause the controller to control:

a fixer applicator to apply a fixer material to a region of a print medium a print engine to apply selectively a print material to sub regions of the region over the fixer material;

an overcoat applicator to apply an overcoat material over the fixer material and the print material in the region;

wherein the fixer material prevents the print material from penetrating the print medium, and prevents the overcoat material not in the sub regions from forming a durable coating.

15. The system of claim 1, further comprising a dryer to condition the overcoat material in direct contact with the fixer material into a nondurable layer.

16. The system of claim 15, further comprising a cleaning element to remove the overcoat material from the areas of the regions not in the sub region.

17. The system of claim 15, wherein the nondurable layer comprises a powder.

18. The system of claim 1, further comprising a cleaning element to remove the overcoat material from the areas of the regions not in the sub region.

19. The system of claim 18, wherein the nondurable layer comprises a powder.

* * * * *

UNITED STATES PATENT AND TRADEMARK OFFICE
CERTIFICATE OF CORRECTION

PATENT NO. : 10,252,556 B2
APPLICATION NO. : 15/614724
DATED : April 9, 2019
INVENTOR(S) : Oren Levin et al.

Page 1 of 1

It is certified that error appears in the above-identified patent and that said Letters Patent is hereby corrected as shown below:

In the Claims

In Column 6, Line 32, Claim 5, after "The" delete "printing".

Signed and Sealed this
Twenty-eighth Day of January, 2020

Andrei Iancu
*Director of the United States Patent and Trademark Office*